(12) United States Patent
Tamura

(10) Patent No.: US 6,927,962 B2
(45) Date of Patent: Aug. 9, 2005

(54) SUBMERGENCE-RESPONSIVE SWITCHING MEMBER DRIVING CIRCUIT

(75) Inventor: Hideki Tamura, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 362 days.

(21) Appl. No.: 10/361,473

(22) Filed: Feb. 10, 2003

(65) Prior Publication Data

US 2003/0151864 A1 Aug. 14, 2003

(30) Foreign Application Priority Data

Feb. 14, 2002 (JP) ........................... 2002-037085

(51) Int. Cl.[7] ............................................... H02H 5/04
(52) U.S. Cl. ....................................... 361/104; 307/10.1
(58) Field of Search ..................... 361/46, 104; 307/9.1, 307/10.1; 318/283

(56) References Cited

U.S. PATENT DOCUMENTS

| | | | | |
|---|---|---|---|---|
| 5,547,208 A | * | 8/1996 | Chappell et al. | 180/281 |
| 5,925,997 A | | 7/1999 | Yamaoka | 318/483 |
| 6,031,296 A | * | 2/2000 | Takagi et al. | 307/10.1 |
| 6,060,794 A | * | 5/2000 | Takagi et al. | 307/125 |
| 6,201,363 B1 | * | 3/2001 | Miyazawa | 318/283 |
| 6,278,250 B1 | * | 8/2001 | Sasaki | 318/283 |
| 6,288,506 B1 | * | 9/2001 | Hiwatari | 318/283 |
| 6,333,685 B1 | * | 12/2001 | Miyake | 340/425.5 |
| 6,417,636 B2 | * | 7/2002 | Takagi | 318/445 |
| 6,459,168 B1 | * | 10/2002 | Miyake et al. | 307/10.1 |
| 6,489,739 B2 | * | 12/2002 | Maldonado | 318/445 |

FOREIGN PATENT DOCUMENTS

JP       HEI 11-125063       5/1999

* cited by examiner

Primary Examiner—Stephen W. Jackson
Assistant Examiner—Boris Benenson
(74) Attorney, Agent, or Firm—Brinks Hofer Gilson & Lione

(57) ABSTRACT

A submergence-responsive switching member driving circuit includes: a driving unit for driving a switching member of a vehicle so as to open or close it by means of a driving current that flows through between two current input-output ends; a first power terminal for supplying the driving current; relays having exciting coils and switching contacts Sw1, SW2, which, so long as a control current flows through the exciting coil, connect each of the current input-output ends to the first power terminal respectively by means of the switching contacts, and further there are provided power breaking means for breaking, when submerged in water, supply of the control current to the first exciting coil of the first relay.

5 Claims, 4 Drawing Sheets

SUBMERGENCE-RESPONSIVE SWITCHING MEMBER DRIVING CIRCUIT

BACKGROUND OF THE INVENTION

1. Field of the Invention

The present invention relates to an automotive switching member driving circuit, and more particularly to a submergence-responsive switching member driving circuit capable of opening a switching member within a certain period of time (for example, one to five minutes) even when submerged in water.

2. Description of the Prior Art

With reference to FIG. 3, the description will be made of a switching member driving circuit for generally driving an automotive switching member. As shown in FIG. 3, the switching member driving circuit is made up of a CPU31, a driving unit 32, relays RL1 and RL2, transistors TR1 and TR2 and a power terminal VCC.

The CPU31 has a plurality of terminals for input and output, and outputs a very small current that becomes a signal for turning ON/OFF the transistor TR1, TR2 from output terminals (UP, DOWN).

The driving unit 32 is a motor capable of rotating in a forward or reverse direction for switching a switching member (not shown), and in the circuit shown in FIG. 3, when a current flows from an upper side to a lower side, the driving unit 32 rotates (UP) so as to close the switching member, and when the current flows from the lower side to the upper side, the driving unit 32 rotates (DOWN) so as to open the switching member The relays RL1, RL2 have switches SW1, SW2 and exciting coils L1, L2, and only when a control current flows through the exciting coils L1, L2, power supply from the power terminal VCC is structured so as to be supplied to the driving unit 32 through the switches SW1, SW2.

In the transistor TR1, a base is connected to the output terminal UP of the CPU31 through a resistance R3, a collector is connected to the power terminal VCC through the exciting coil L1, and an emitter is grounded.

Also, in the transistor TR2, a base is connected to the output terminal DOWN of the CPU31 through a resistance R4, a collector is connected to the power terminal VCC through the exciting coil L2, and an emitter is grounded.

By the above-described structure, when a close switch or an-open switch (which are not shown) is operated, a signal corresponding to the switch thus operated is inputted into the input terminal of the CPU31, and the CPU31 outputs a signal with a very small current from the output terminal UP or DOWN to the base of the transistors TR1, TR2 in accordance with the signal inputted. The signal outputted causes the transistors TR1, TR2 to turn ON/OFF for causing a control current to flow through the exciting coils L1, L2, whereby the switches SW1, SW2 are changed over to supply on-board power supply (voltage of power terminal VCC) to the driving unit 32. Thereby, the driving unit 32 rotates in a forward/reverse direction to open/close the automotive switching member.

In the case of the circuit shown in FIG. 3, however, potential at point A and point B at both ends of the exciting coil L1 is at the same potential as the power terminal VCC when the driving unit 32 is not driven. If this circuit is submerged in water in this state, there is a short between the point A and point B, and a grounding pattern, the frame grounded or the like existing in the PCB pattern within this circuit.

When there is a short between the point B and the grounding pattern, since a current flows through the exciting coil L1, the switch SW1 is switched on the power terminal VCC side. At this time, since the switch SW2 side is grounded, a current flows through the driving unit 32 to drive the driving unit 32 in a close direction.

Since a similar thing may occur even at point D of the exciting coil L2, the driving unit 32 operates in the forward/reverse direction at random.

In the case where this circuit is used in an on-board power window device, when the window is opened or closed at random under the state that the driver has no intention to operate the window, and under particular conditions that the driver cannot perform calm and adequate judgment or action that the vehicle has been submerged in water, the driver is thrown into a panic, and is cornered into a state in which he cannot judge or act properly within an adequate period of time, which may possibly cause him to be in an increasingly dangerous condition.

Also, when the window operates in a direction to close under the state of affairs that the driver is making an attempt to escape from within the vehicle compartment, it becomes impossible to escape, and there is hidden a danger of being thrown into a panic in the same manner as the foregoing.

In order to avoid this danger, a circuit shown in FIG. 4 has been considered. The circuit shown in FIG. 4 is such that in order to change the method shown in FIG. 3 for performing the control of energization to the exciting coils L1, L2 on the ground side to a method for controlling on the power supply side, each of transistors TR3 and TR4 is interposed between the transistors TR1, TR2 and one end of the exciting coils L1, L2, the emitter is connected to the power terminal VCC and the other end of the exciting coils L1, L2 is grounded.

In the case of the circuit of FIG. 4, potential at point A and point B of the exciting coil L1 or at point C and point D of the exciting coil L2 is at the same potential as the ground potential when the driving unit 32 is not driven. When this circuit is submerged in water in this state, there is a short between the point A and point B, and a grounding pattern existing in the PCB pattern or the like of this circuit, and no current flows through the exciting coil L1 or L2. When, however, there is a short between the emitter of the transistors TR3, TR4 connected to the power terminal VCC for controlling the feed to the coils L1, L2 and the collector connected to the coils, the point B of the exciting coil L1 or the point D of the coil L2 is to short out with the power terminal VCC, and therefore, a current flows through the coil L1 or L2 and there is a possibility that the switching member performs a random switching operation in the same manner as in the circuit shown in FIG. 3.

Also, even though submersion is detected and the driving method for the driving circuit itself to the driving unit is restricted by means of the CPU or the like, if a short is caused in a control portion of a feed switching element (such as relay) to the driving unit within the driving circuit and a malfunction occurs, there is a possibility of performing the same unintended random switching operation as the foregoing.

Further, as this countermeasure, there can also be considered a method for applying a moisture-proof or water-resisting coating to the control portion of the feed switching element (such as relay) to the driving unit within the driving circuit, and the like. However, the coating itself raises the product price, and both regulations on an amount of coating required for those coating to function semi-permanently and management of the amount of coating for actual product assembly are not easy and a possibility of affecting the product price from that aspect is hidden.

SUMMARY OF THE INVENTION

The present invention has been achieved in order to solve this problem, and is aimed to provide, at low cost, a submergence-responsive switching member driving circuit in which when, submerged in water, a switching member does not close unexpectedly, capable of securely opening the switching member when it should be opened.

As solution means for solving the above-described problem, there is provided a submergence-responsive switching member driving circuit according to the present invention, comprising: a driving unit having two current input-output ends, for driving a switching member of a vehicle so as to open or close it depending upon a difference in direction of a driving current that flows through between the current input-output ends; a first power terminal for supplying the driving current; first and second relays having exciting coils and switching contacts, which, so long as a control current flows through the exciting coils, connect each of the above-described current input-output ends to the first power terminal respectively by means of the switching contacts; and power breaking means for breaking, when submerged in water, supply of the control current to one of the exciting coils, wherein the power breaking means have a power supply line for causing the control current to flow and a grounding line, and the above-described two lines are disposed adjacent and in parallel to each other in a state in which their conductors are exposed respectively.

By this structure, since when submerged in water, the two lines are short-circuited, a control current which flows through the exciting coil of one of the first and second relays can be easily broken, and the switching contact of one relay becomes inoperable, and therefore, there is no unexpected opening or closing.

Further, there is provided a second power terminal for supplying the control current, the switching member is structured so as to be driven to be closed when the control current flows through only the exciting coil of the first relay, and to be driven to be opened when the control current flows through only the exciting coil of the second relay, and the power breaking means are connected between the exciting coil of the first relay and the power terminal of the second power terminal.

By this structure, since, when submerged in water, the switching contact of the first relay becomes inoperable, there is no unexpected closing operation, and when a control current flows through the exciting coil of the second relay, the switching member can be opened.

Further, the power supply line is made thinner.

This structure is capable of fusing the power supply line when short-circuited.

Also, the two lines of the power breaking means are printed and formed on a printed substrate.

By this structure, the power supply line can be formed to be thinner, and the power supply line and the grounding line can be made adjacent to each other with high accuracy.

DESCRIPTION OF THE PREFERRED EMBODIMENTS

Hereinafter, with reference to FIGS. 1 and 2, the description will be made of a submergence-responsive switching member driving circuit according to the present invention.

Figure 1:
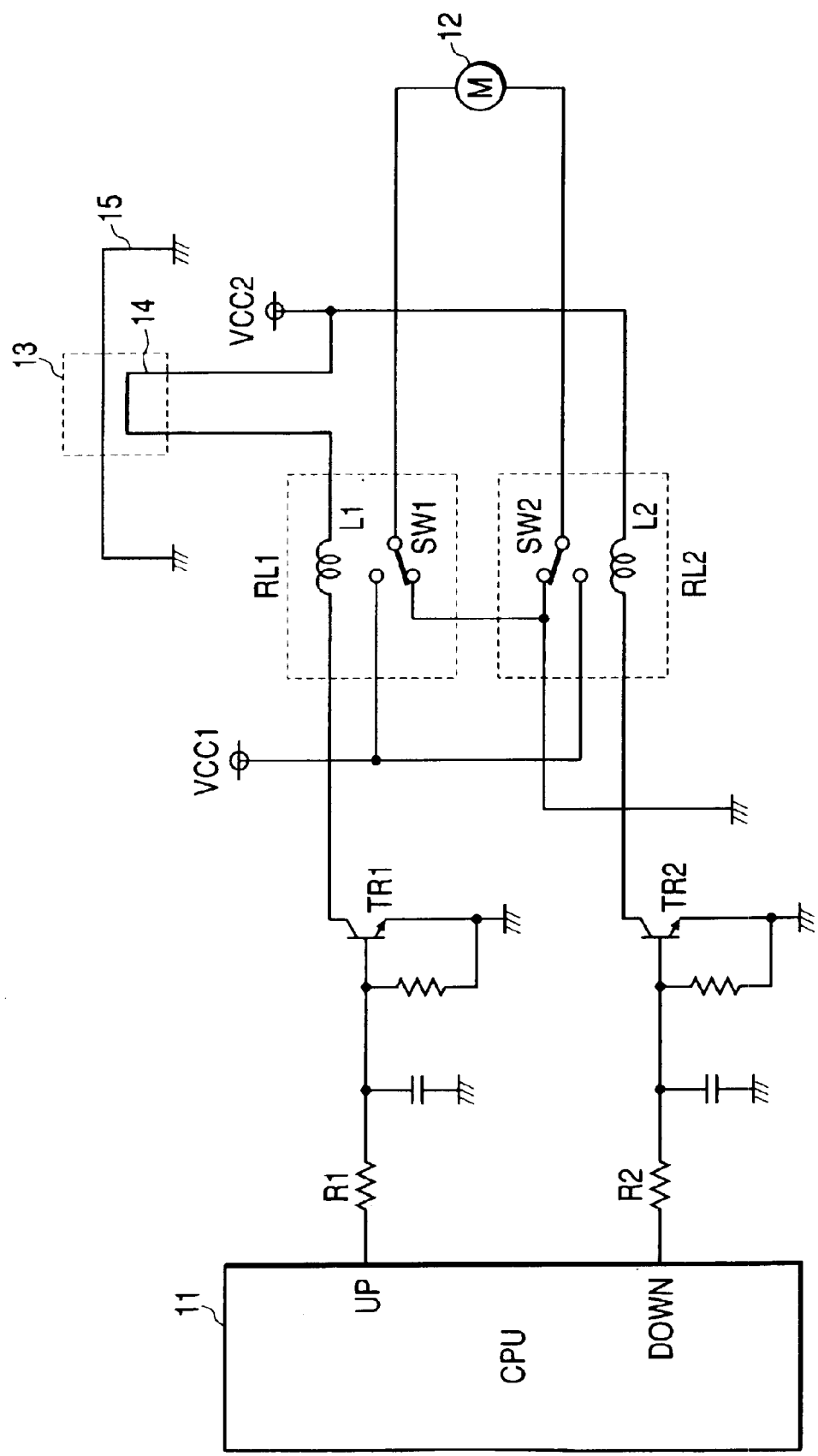
FIG. 1 is a circuit diagram showing structure of a submergence-responsive switching member driving circuit according to the present invention.

FIG. 1 is a circuit diagram showing structure of a submergence-responsive switching member driving circuit according to the present invention. The submergence-responsive switching member driving circuit according to the present invention is made up of: a controller (CPU) 11; a driving unit 12; first and second relays RL1 and RL2; transistors TR1 and TR2; first and second power terminals VCC1 and VCC2; and power breaking means 13.

The CPU11 is made up of a microcomputer, ASIC (Application Specific Integrated Circuit) and the like, and has a plurality of terminals for input and output. To the input terminal, a voltage that becomes a signal is inputted from an operating switch (not shown), and from the output terminal (UP, DOWN), a voltage which becomes a signal for turning ON/OFF the transistors TR1 and TR2 is outputted.

The driving unit 12 has two current input-output ends for opening and closing a switching member (such as a window, a sunroof, and a door) of a vehicle (not shown), and is made up of, for example, a motor capable of rotating in a forward or reverse direction. In the circuit shown in FIG. 1, the driving unit 12 rotates (UP) to close the switching member when a current flows from the upper side to the lower side, and rotates (DOWN) to open the switching member when the current flows from the lower side to the upper side.

The relay RL1 or RL2 has a switching contact SW1 or SW2 and an exciting coil L1 or L2 respectively, and respective movable contacts of the switching contacts SW1 and SW2 are connected to power input-output ends of the driving unit 12, which are different from each other, and one fixed contact is connected to the first power terminal VCC1, and the other fixed contact is connected to the ground.

Thus, movable contacts of the switching contacts SW1 and SW2 are usually connected to fixed contacts on the ground side as shown and are connected to the fixed contacts on the first power terminal VCC1 side only while a current is flowing through the exciting coils L1 and L2. In other words, the structure is arranged such that when a voltage is applied to only one of the exciting coils L1 and L2, power supply from the first power terminal VCC1 is supplied to the driving unit 12 through the switching contacts SW1, SW2 so that the driving unit 12 opens or closes the switching member.

In the transistor TR1, a base is connected to the output terminal UP of the CPU11 through a resistance R1, a collector is connected to the second power terminal VCC2 through the exciting coil L1 and the power breaking means 13, and an emitter is grounded.

Also, in the transistor TR2, the base is connected to the output terminal DOWN of the CPU11 through a resistance R2, the collector is connected to the second power terminal VCC2 through an exciting coil L2, and the emitter is grounded.

Figure 2:
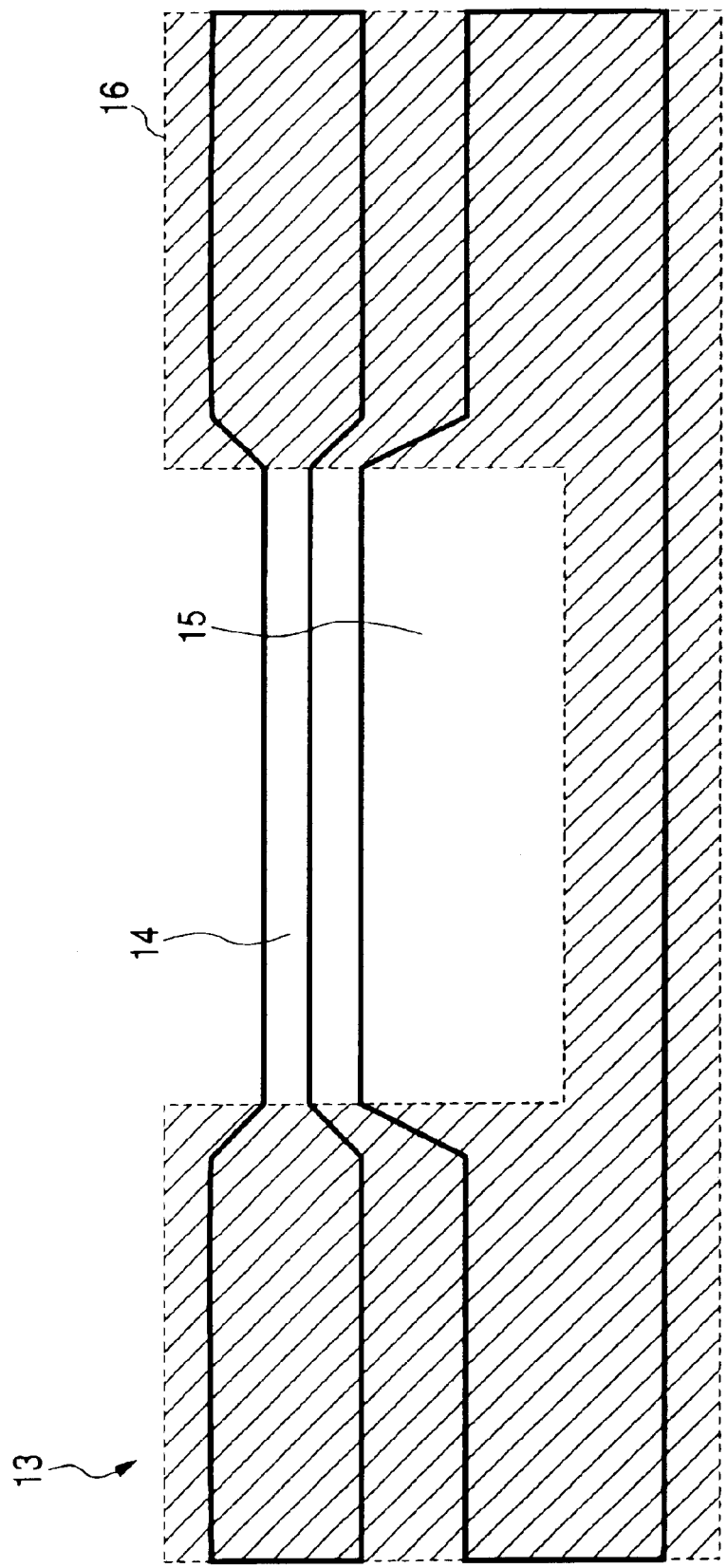
FIG. 2 is a view showing structure of power breaking means for the submergence-responsive switching member driving circuit according to the present invention.
Figure 3:
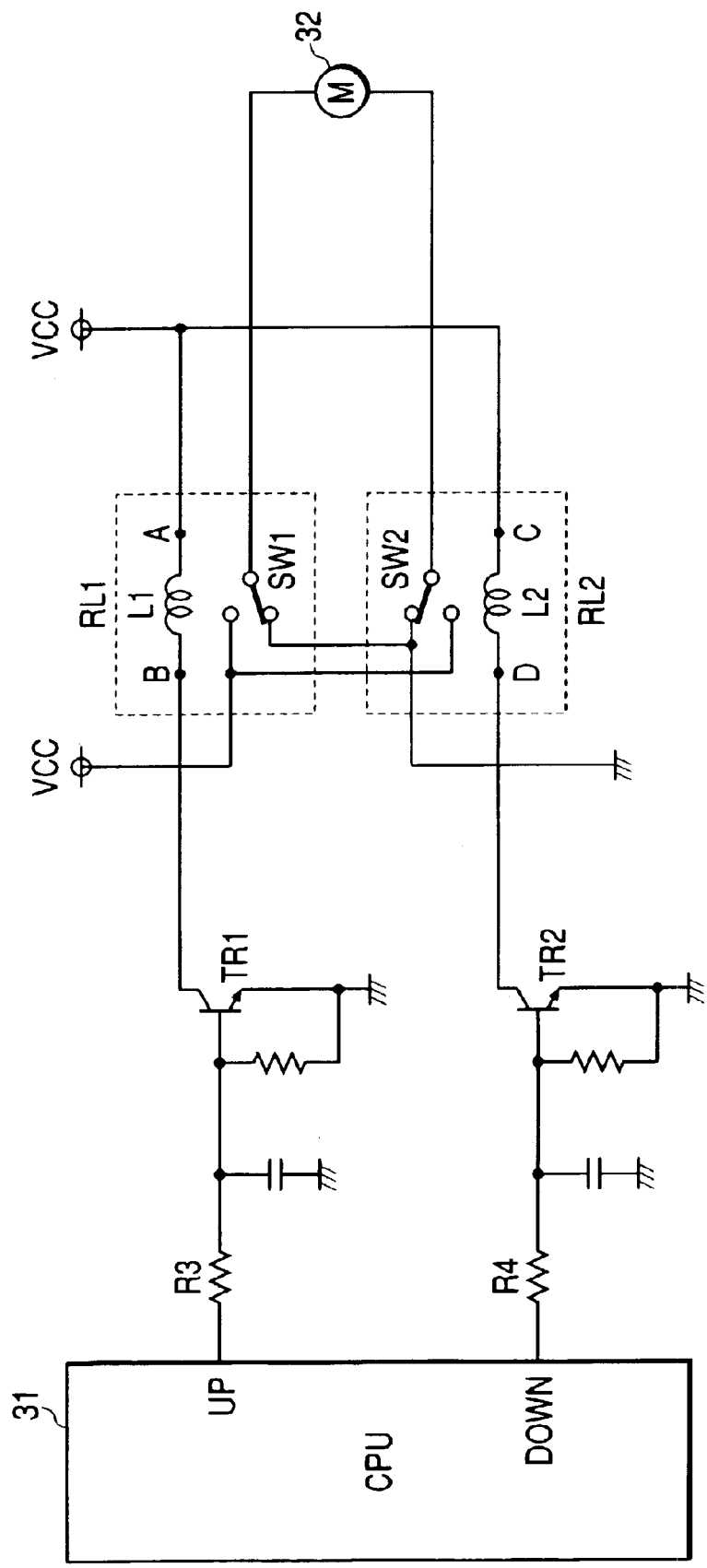
FIG. 3 is a circuit diagram showing structure of a submergence-responsive switching member driving circuit according to the prior art.
Figure 4:
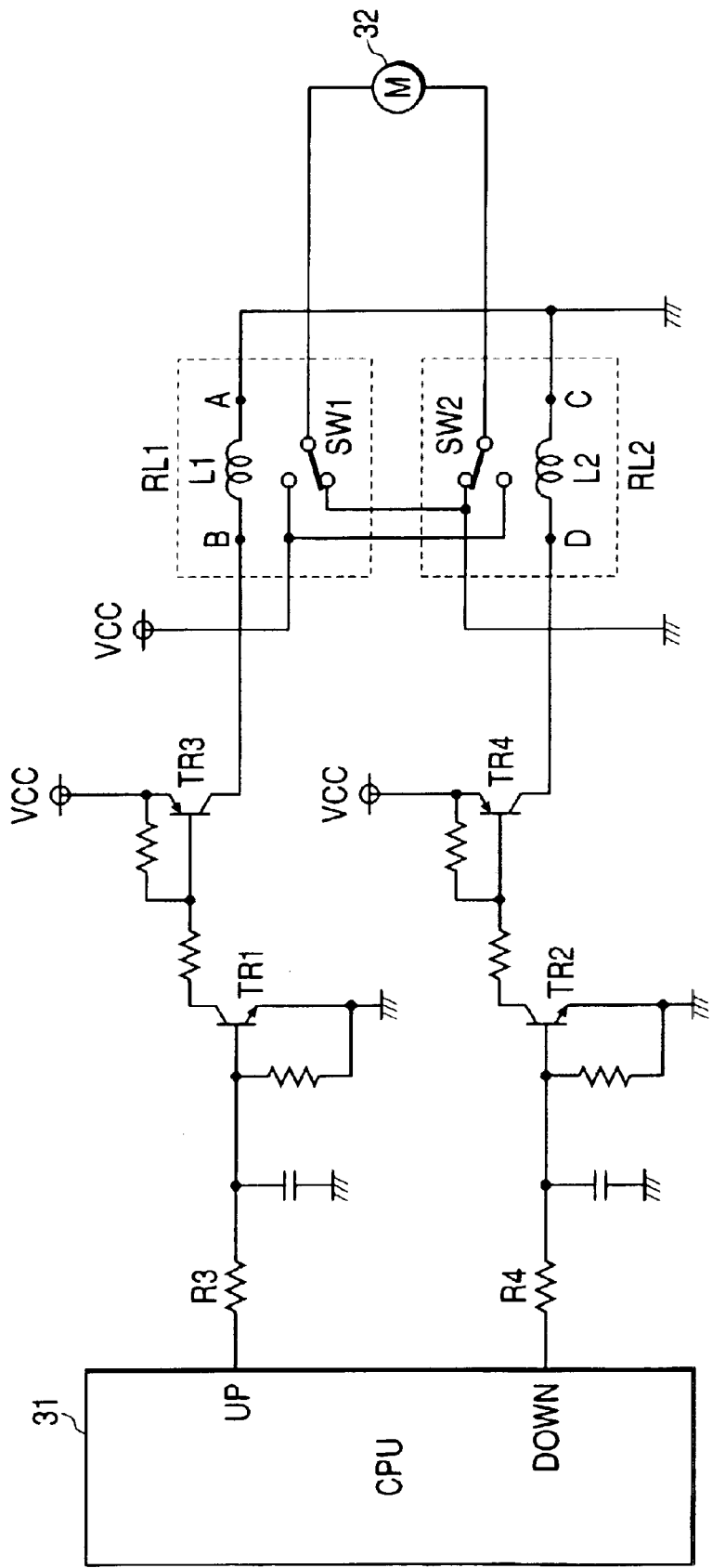
FIG. 4 is a circuit diagram showing structure of another submergence-responsive switching member driving circuit according to the prior art.

The power breaking means 13 is constructed by arranging the power supply line 14 between the exciting coil L1 and the second power terminal VCC2 and a grounding line 15 with both ends grounded adjacent to each other and in parallel on, for example, a PCB as shown in FIG. 2, and as regards this adjacent portion, the power supply line 14 is formed to be thin while the grounding line 15 is formed to be thick, and a photoresist (covering material) 16 has been removed.

This power breaking means 13 is constructed such that both the lines 14 and 15 are electrically brought into conduction when both the lines 14 and 15 are submerged in water, and after a further lapse of time, the power supply line 14 is broken by a current from the second power terminal VCC2.

When a close switch (not shown) or an open switch (not shown) is operated by the above-described structure, a signal corresponding to the operated switch is inputted into the input terminal of the CPU11; the CPU11 outputs a signal with a very small current from the output terminal UP or DOWN to the base of the transistors TR1, TR2 in accordance with the signal inputted; and the signal outputted turns ON/OFF the transistors TR1, TR2 to cause a control current to flow through the exciting coils L1, L2, whereby the switching contacts SW1, SW2 are changed over to supply the on-board power supply (voltage of the first power terminal VCC1) to the driving unit 12 for thereby rotating the driving unit 12 in a forward/reverse direction to open/close the automotive switching member.

Also, when an automobile is submerged in water, water enters the automobile and the power breaking means 13 is submerged in water, there is a short between the power supply line 14 and the grounding line 15, and after a further lapse of time, a part of the power supply line 14 will be broken.

Since a current stops flowing through the exciting coil L1, the switching contact SW1 of the relay RL1 is to remain connected to the ground.

In this state, the driving unit 12 does not operate in the close direction. Therefore, no irregular switching operation will be performed.

When the open switch (not shown) is operated at this time, a corresponding signal is inputted into the input terminal of the CPU11; the CPU11 outputs a signal with very small current from the output terminal DOWN to the base of the transistor TR2; and the signal turns ON the transistor TR2 to cause a control current from the second power terminal VCC2 to flow through the exciting coil L2. Therefore, the switching contact SW2 is switched on the first power terminal VCC1 side to supply power supply to the driving unit 12 from the lower side to the upper side as shown in the drawing, whereby the driving unit 12 rotates in the reverse direction to open the automotive switching member.

Due to such a structure and operation as described above, even in submergence in water, there is no possibility that the switching member performs any unexpected switching operation, and when the open switch is operated, the switching member can be securely opened, and it is possible for the occupant to escape from the automobile.

In this respect, as a better structure, of the power supply lines 14 for supplying power supply, for the width of a course at a place where the grounding line 15 is provided in parallel and the photoresist 16 is eliminated, the minimum line width through which a current to be consumed by the exciting coil L1 flows is desirable. When the power breaking means 13 is constituted of a PCB, about 0.3 mm or less is desirable in terms of machinability and cost. If it is possible to make it even thinner, it will become possible for the power supply line 14 of the power breaking means 13 to be broken at an earlier stage, which is more effective. In the case of PCB, however, since it becomes gradually more expensive as it is made thinner, such a pattern width as to exert no negative influence on the product price is desirable. Further, the width of course of the grounding line 15 to be provided side by side with the power supply line 14 is preferably of sufficiently thick course width as compared with the course width at the portion where the photoresist 16 of the power supply line 14 is eliminated.

When the power breaking means 13 is constituted of a PCB, the course width is preferably equal to or more than ten times that of the power supply line 14. A gap in course between the power supply line 14 and the grounding line 15 to be arranged in parallel is set to be equal to or less than the course width of the power supply line 14; the course length is preferably as long as possible; and the course length of a parallel portion of 10 mm to 50 mm is preferable. If the course length is made short, the power connection side of the power supply line 14 disconnected and the connected side of the submergence-responsive switching member driving circuit to the transistor TR1 will be short-circuited, and the effect of the disconnection cannot be obtained.

Also, as regards a place for installing the power breaking means 13, in order to detect submergence quickly, it is effective to install it on the lower side forward within the vehicle compartment for a front engine vehicle, and it may be possible to provide a path for water submerged to install it on the path.

As described above, there is provided a submergence-responsive switching member driving circuit according to the present invention, having: a driving unit having two current input and output ends, for driving the switching member of the vehicle so as to open or to close depending upon a difference in the direction of the driving current flowing through between the current input and output ends; a first power terminal for supplying the driving current; first and second relays having exciting coils and switching contacts, which, so long as a control current flows through the exciting coils, connect each of the current input and output ends to the first power terminal respectively by means of the switching contacts; and power breaking means for breaking, when submerged in water, supply of the control current to one of the exciting coils, wherein the power breaking means have a power supply line for causing the control current to flow and a ground line, and since those two lines are disposed adjacent and in parallel to each other in a state in which their conductors are exposed, it is possible to easily break control current flowing through one exciting coil of the first or second relay because when, submerged in water, those two lines are short-circuited, and one relay switching contact becomes inoperable, and therefore, no unexpected switching operation will be performed.

What is claimed is:

1. A submergence-responsive switching member driving circuit, comprising: a driving unit having two current input-output ends, for driving a switching member of a vehicle so as to open or close the switching member depending upon a difference in direction of a driving current that flows through between the current input-output ends;

a first power terminal for supplying the driving current;
first and second relays having exciting coils and switching contacts, which, so long as a control current flows through the exciting coils, connect each of the current input-output ends to the first power terminal respectively by means of the switching contacts; and power breaking means for breaking, when submerged in water, the supply of the control current to one of the exciting coils, wherein the power breaking means have a power supply line for causing the control current to flow and a ground line, and wherein the power supply line and the ground line are disposed adjacent and in parallel to each other in a state in which conductors of the power supply line and the ground line are exposed respectively.

2. The submergence-responsive switching member driving circuit according to claim 1, wherein there is provided a second power terminal for supplying the control current; wherein the switching member is constructed so as to be driven to be closed when the control current flows through only the exciting coil of the first relay, and to be driven to be opened when the control current flows through only the exciting coil of the second relay; and wherein the power breaking means are connected between the exciting coil of the first relay and the second power terminal.

3. The submergence-responsive switching member driving circuit according to claim 2, wherein the power supply line has a minimum line width that permits the control current to be consumed by the exciting coil of the first relay.

4. The submergence-responsive switching member driving circuit according to claim 2, wherein the power supply line and grounding line of the power breaking means are printed and formed on a printed substrate.

5. The submergence-responsive switching member driving circuit according to claim 3, wherein the power Supply line and grounding line of the power breaking means are printed and formed on a printed substrate.

* * * * *

UNITED STATES PATENT AND TRADEMARK OFFICE
CERTIFICATE OF CORRECTION

PATENT NO. : 6,927,962 B2
DATED : August 9, 2005
INVENTOR(S) : Hideki Tamura

It is certified that error appears in the above-identified patent and that said Letters Patent is hereby corrected as shown below:

<u>Column 8,</u>
Line 13, after "power" delete "Supply" and substitute -- supply -- in its place.

Signed and Sealed this

Sixth Day of December, 2005

JON W. DUDAS
*Director of the United States Patent and Trademark Office*